(12) United States Patent
Xie et al.

(10) Patent No.: US 11,952,515 B2
(45) Date of Patent: Apr. 9, 2024

(54) TWO-COMPONENT ADHESIVE COMPOSITIONS BASED ON ISOCYANATE-TERMINATED SILANES, AND METHODS FOR MAKING SAME

(71) Applicant: Dow Global Technologies LLC, Midland, MI (US)

(72) Inventors: Rui Xie, Pearland, TX (US); Jie Wu, Lake Jackson, TX (US); Kalyan Sehanobish, Sanford, MI (US)

(73) Assignee: Dow Global Technologies LLC, Midland, MI (US)

( * ) Notice: Subject to any disclaimer, the term of this patent is extended or adjusted under 35 U.S.C. 154(b) by 769 days.

(21) Appl. No.: 17/051,914

(22) PCT Filed: Feb. 25, 2019

(86) PCT No.: PCT/US2019/019364
§ 371 (c)(1),
(2) Date: Oct. 30, 2020

(87) PCT Pub. No.: WO2019/212625
PCT Pub. Date: Nov. 7, 2019

(65) Prior Publication Data
US 2021/0230465 A1 Jul. 29, 2021

Related U.S. Application Data

(60) Provisional application No. 62/664,420, filed on Apr. 30, 2018.

(51) Int. Cl.
| | | |
|---|---|---|
| *C09J 175/08* | (2006.01) | |
| *C09J 175/06* | (2006.01) | |
| *C08G 18/12* | (2006.01) | |
| *C08G 18/28* | (2006.01) | |
| *C08G 18/32* | (2006.01) | |
| *C08G 18/38* | (2006.01) | |
| *C08G 18/40* | (2006.01) | |
| *C08G 18/42* | (2006.01) | |
| *C08G 18/48* | (2006.01) | |
| *C08G 18/75* | (2006.01) | |
| *C08G 18/76* | (2006.01) | |

(52) U.S. Cl.
CPC ........... *C09J 175/08* (2013.01); *C09J 175/06* (2013.01); *C08G 18/12* (2013.01); *C08G 18/289* (2013.01); *C08G 18/3206* (2013.01); *C08G 18/3893* (2013.01); *C08G 18/4018* (2013.01); *C08G 18/4288* (2013.01); *C08G 18/4829* (2013.01); *C08G 18/755* (2013.01); *C08G 18/7642* (2013.01); *C08G 18/7671* (2013.01)

(58) Field of Classification Search
CPC ....... C09J 175/08; C09J 175/06; C08G 18/12; C08G 18/289; C08G 18/3206; C08G 18/3893; C08G 18/4018; C08G 18/4288; C08G 18/4829; C08G 18/755; C08G 18/7642; C08G 18/7671
USPC ...................................................... 156/331.7
See application file for complete search history.

(56) References Cited

U.S. PATENT DOCUMENTS

| | | |
|---|---|---|
| 8,697,800 B2 | 4/2014 | Gentschev et al. |
| 8,865,822 B2 | 10/2014 | Paschkowski et al. |
| 11,702,572 B2 * | 7/2023 | Li .......................... B32B 27/32 |
| | | 156/331.7 |
| 2005/0032974 A1 | 2/2005 | Krebs et al. |
| 2012/0282444 A1 | 11/2012 | Zander et al. |
| 2015/0159063 A1 | 6/2015 | Yamada et al. |

FOREIGN PATENT DOCUMENTS

| | | |
|---|---|---|
| DE | 3220865 | 12/1983 |
| EP | 0354472 | 2/1990 |
| JP | 2006-111811 A | 4/2006 |
| JP | 2014-025000 A | 2/2014 |

OTHER PUBLICATIONS

PCT/US2019/019364, International Search Report and Written Opinion dated May 5, 2019.
PCT/US2019/019364, International Preliminary Report on Patentability dated Nov. 3, 2020 .

\* cited by examiner

*Primary Examiner* — James D Sells
(74) *Attorney, Agent, or Firm* — Boyle Fredrickson, S.C.

(57) ABSTRACT

The disclosed adhesive compositions comprise (A) an isocyanate component comprising (i) an isocyanate and (ii) an isocyanate-terminated silane compound. In some embodiments, the isocyanate-terminated silane compound (ii) is the reaction product of a polyisocyanate and an isocyanate-reactive compound comprising a silane group and at least one isocyanate-reactive group selected from the group consisting of —OH, —SH, and —NHR, where R stands for an alkyl remainder having from 1 to 12 C atoms or a cycloaliphatic or aromatic remainder having between 6 and 12 C atoms. In other embodiments, the isocyanate-terminated silane compound (ii) is the reaction product of a polyisocyanate selected from the group consisting of isophorone diisocyanate, m-xylylene diisocyanate, mixtures thereof, dimers thereof, trimers thereof, prepolymers thereof, and combinations thereof and an isocyanate-reactive compound comprising a silane group and at least one isocyanate-reactive group of —NH₂. Methods for preparing the disclosed two-component adhesive compositions, and methods for forming laminate comprising same, are also disclosed.

12 Claims, No Drawings

TWO-COMPONENT ADHESIVE COMPOSITIONS BASED ON ISOCYANATE-TERMINATED SILANES, AND METHODS FOR MAKING SAME

REFERENCE TO RELATED APPLICATIONS

The present application claims the benefit of U.S. Provisional Application No. 62/664,420, filed on Apr. 30, 2018.

FIELD OF THE DISCLOSURE

The instant disclosure relates to two-component adhesive compositions. In some embodiments, the adhesive compositions comprise (A) an isocyanate component comprising (i) an isocyanate and (ii) an isocyanate-terminated silane compound that is the reaction product of a polyisocyanate and an isocyanate-reactive compound comprising a silane group and at least one isocyanate-reactive group selected from the group consisting of ¬—OH, —SH, and —NHR, where R stands for an alkyl remainder having from 1 to 12 C atoms or a cycloaliphatic or aromatic remainder having between 6 and 12 C atoms. The adhesive compositions further comprise (B) an isocyanate-reactive component comprising a hydroxyl-terminated compound, wherein the isocyanate component (A) and isocyanate-reactive component (B) are present at a stoichiometric ratio (NCO to OH) of from 1 to 5.

In other embodiments, the adhesive compositions comprise (A) an isocyanate component comprising (i) an isocyanate and (ii) an isocyanate-terminated silane compound that is the reaction product of a polyisocyanate selected from the group consisting of isophorone diisocyanate, m-xylylene diisocyanate, mixtures thereof, dimers thereof, trimers thereof, prepolymers thereof, and combinations thereof and an isocyanate-reactive compound comprising a silane group and at least one isocyanate-reactive group of —NH$_2$. In such embodiments, the adhesive compositions further comprise (B) an isocyanate-reactive component comprising a hydroxyl-terminated compound, wherein the isocyanate component (A) and isocyanate-reactive component (B) are present at a stoichiometric ratio (NCO to OH) of from 1 to 5.

Methods for preparing the disclosed two-component adhesives and methods for making laminate structures comprising same are also disclosed. The disclosed adhesive compositions can be solventless or solvent-based. The disclosed adhesive compositions exhibit improved bond strength, temperature resistance, and chemical resistance compared to existing amino silane alternatives, while maintaining extended potlife, and are useful for food packaging, pharmaceutical packaging, and industrial laminations.

BACKGROUND AND SUMMARY OF THE DISCLOSURE

Adhesive compositions are useful for a wide variety of purposes. For instance, adhesive compositions are used to bond together substrates such as polyethylene, polypropylene, polyester, polyamide, metal, metallized, paper, or cellophane to form composite films, i.e., laminates. These types of adhesives are commonly referred to as "laminating adhesives."

One particular variety of laminating adhesives includes two-component polyurethane-based adhesives. Typically, a two-component polyurethane-based laminating adhesive includes an isocyanate component comprising an isocyanate-containing prepolymer and/or a polyisocyanate and an isocyanate-reactive component comprising a hydroxyl-terminated compound. The prepolymer can be obtained by the reaction of excess isocyanate with a polyether and/or polyester containing two or more hydroxyl groups per molecule. The isocyanate-reactive component comprises a polyether and/or polyester initiated with two or more hydroxyl groups per molecule. The two components are typically combined in a predetermined ratio, or "premixed," and then applied on a surface of a first substrate ("carrier web"). The surface of the first substrate is then brought together with a surface of a second substrate to form a laminate structure. More recently, faster curing two-component systems have been developed in which each component is applied individually to a surface of a substrate. The surfaces of each substrate are then brought together so that the two components mix, thereby forming the laminate structure. Additional layers of substrate can be added to the laminate structure with additional layers of adhesive composition located between each successive substrate. The adhesive is then cured, either at room temperature or elevated temperature, thereby bonding the substrates together.

Such laminating adhesives are widely can be used in the manufacture of film/film and film/foil laminates used in the packaging industry, especially for food packaging, pharmaceutical packaging, and industrial laminations, where exposure to aggressive chemicals at elevated temperatures is typical. To improve temperature and chemical resistance of the adhesives, adhesion promoters are sometimes used. In particular, silane adhesion promoters are used in polyurethane based laminate adhesives for improved adhesion, and heat and product resistance. Limited silane compounds are approved by the European Commission for food contact applications. One of the approved silanes is 3-aminopropyltriethoxysilane. This amino silane is often incorporated in the isocyanate-reactive component or the isocyanate component of the laminate adhesive. When incorporated in the isocyanate-reactive component of the laminate adhesive, due to higher reactivity of the amine group in the compound, it often leads to shortened potlife and sometimes precipitation of the reaction product of amino silane and isocyanate, especially when it is incorporated at a higher loading level, therefore making amino silane unsuitable for lamination applications. On the other hand, when incorporated in the isocyanate component, amino silanes can result in haziness to the isocyanate component and sometimes precipitation due to high reactivity of the amino silane with isocyanate.

Therefore, laminating adhesive compositions comprising silane adhesion promoters are desirable that overcome disadvantages of using conventional amino silanes. As disclosed herein, an amino silane compound, such as 3-aminopropyltriethoxysilane is first reacted with an isocyanate to form an isocyanate-terminated silane compound. The isocyanate-terminated silane compound is clear and stable, and can be easily incorporated into an isocyanate component of a laminating adhesive composition without the tradeoffs of shortened potlife and development of haziness or precipitation in the adhesive composition. In addition, the isocyanate-terminated silane compounds provide laminating adhesive compositions exhibiting improved heat and product resistance as compared to those comprising traditional amino silane alternatives.

In some embodiments, the disclosed adhesive compositions comprise (A) an isocyanate component comprising (i) an isocyanate and (ii) an isocyanate-terminated silane compound that is the reaction product of a polyisocyanate and an isocyanate-reactive compound comprising a silane group and at least one isocyanate-reactive group selected from the group consisting of ¬—OH, —SH, and —NHR, where R stands for an alkyl remainder having from 1 to 12 C atoms or a cycloaliphatic or aromatic remainder having between 6 and 12 C atoms. The adhesive compositions further comprise (B) an isocyanate-reactive component comprising a hydroxyl-terminated compound, wherein the isocyanate component (A) and isocyanate-reactive component (B) are present at a stoichiometric ratio (NCO to OH) of from 1 to 5.

In other embodiments, the disclosed adhesive compositions comprise (A) an isocyanate component comprising (i) an isocyanate and (ii) an isocyanate-terminated silane compound that is the reaction product of a polyisocyanate selected from the group consisting of isophorone diisocyanate, m-xylylene diisocyanate, mixtures thereof, dimers thereof, trimers thereof, prepolymers thereof, and combinations thereof and an isocyanate-reactive compound comprising a silane group and at least one isocyanate-reactive group of —$NH_2$. In such embodiments, the adhesive compositions further comprise (B) an isocyanate-reactive component comprising a hydroxyl-terminated compound, wherein the isocyanate component (A) and isocyanate-reactive component (B) are present at a stoichiometric ratio (NCO to OH) of from 1 to 5.

In some embodiments, methods for preparing two-component adhesives formulations are disclosed. In some embodiments, the methods comprise (1) reacting, at a stoichiometry ratio of from 1.05/1.0 to 20.0/1.0, a polyisocyanate with an isocyanate-reactive compound comprising a silane group and at least one isocyanate-reactive group selected from the group consisting of ¬—OH, —SH, and —NHR, where R stands for an alkyl remainder having from 1 to 12 C atoms or a cycloaliphatic or aromatic remainder having between 6 and 12 C atoms, to form an isocyanate-terminated silane compound, (2) mixing the isocyanate-terminated silane compound with an isocyanate component comprising an isocyanate at a mixing ratio of from 99.0 to 1.0 to 0.5 to 99.5, to form a silane-modified isocyanate component, and (3) mixing the silane-modified isocyanate component with an isocyanate-reactive component comprising a hydroxyl-terminated compound at a stoichiometric ratio (NCO/OH) of from 1.0/1.0 to 5.0/1.0.

In other embodiments, the methods comprise (1) reacting, at a stoichiometry (NCO/NH) ratio of from 1.05/1.0 to 20.0/1.0, a polyisocyanate selected from the group consisting of isophorone diisocyanate, m-xylylene diisocyanate, mixtures thereof, dimers thereof, trimers thereof, prepolymers thereof, and combinations thereof with an isocyanate-reactive compound comprising a silane group and at least one isocyanate-reactive group of —$NH_2$, to form an isocyanate-terminated silane compound, (2) mixing the isocyanate-terminated silane compound with an isocyanate component comprising an isocyanate at a mixing ratio of from 99.0 to 1.0 to 0.5 to 99.5, to form a silane-modified isocyanate component, and (3) mixing the silane-modified isocyanate component with an isocyanate-reactive component comprising a hydroxyl-terminated compound at a stoichiometric ratio (NCO/OH) of from 1.0/1.0 to 5.0/1.0.

Additional components including catalysts, surfactants, leveling agents, defoamers, rheology modifiers, color pigments, adhesion promoters such as phosphate esters and epoxies, can be incorporated in the inventive adhesives to enable certain performance attributes.

The adhesive compositions can be solventless or solvent-based. In solvent-based embodiments, a solvent, such as ethyl acetate, methyl ether ketone, toluene, and mixture of them can be incorporated in the compositions.

In some embodiments, methods for forming a laminate structure are disclosed. In some embodiments, the methods comprise (1) coating the disclosed two-component adhesive compositions on a surface of a first substrate, (2) bringing the surface of the first substrate into contact with a surface of a second substrate, and (3) laminating the two substrates under pressure to form a laminate structure. In other embodiments, the methods comprise (1) uniformly applying the isocyanate component (A) to a surface of a first substrate, (2) uniformly applying the isocyanate-reactive component (B) to a surface of a second substrate, bringing the surfaces of the first substrate and second substrate together, thereby mixing and reacting the isocyanate component and the isocyanate-reactive component to form an adhesive composition between the first substrate and the second substrate, and curing the adhesive composition to bond the first substrate and the second substrate.

DETAILED DESCRIPTION OF THE DISCLOSURE

The two-component adhesive compositions according to this disclosure comprise an isocyanate component and an isocyanate-reactive component, as discussed above.

(A) Isocyanate Component

As discussed herein, in some embodiments the isocyanate component (A) comprises an isocyanate (i) and an isocyanate-terminated silane compound (ii).

(i) Isocyanate

In some embodiments, the isocyanate component comprises an isocyanate. In some embodiments, the isocyanate can be selected from the group consisting of an isocyanate prepolymer, an isocyanate monomer, a polyisocyanate (e.g., dimers, trimmers, etc.), and combinations of two or more thereof. As used herein, a "polyisocyanate" is any compound that contains two or more isocyanate groups. The isocyanate prepolymer is the reaction product of reactants comprising an isocyanate and a polyol. As used herein, the "isocyanate prepolymer" can be a polyisocyanate itself.

In some embodiments, the isocyanate is selected from the group consisting of an aromatic isocyanate, an aliphatic isocyanate, a cycloaliphatic isocyanate, and combinations thereof.

Suitable aromatic isocyanates include, but not limited to, 1,3- and 1,4-phenylene diisocyanate, 1,5-naphthylene diisocyanate, 2,6-tolulene diisocyanate (2,6-TDI), 2,4-tolulene diisocyanate (2,4-TDI), 2,4'-diphenylmethane diisocyanate (2,4'-MDI), 4,4'-diphenylmethane diisocyanate (4,4-MDI), polymeric isocyanates, and combinations thereof.

Suitable aliphatic polyisocyanates advantageously have 3 to 16 carbon atoms, preferably 4 to 12 carbon atoms, in the linear or branched alkylene residue and suitable cycloaliphatic or cycloaliphatic diisocyanates advantageously have 4 to 18 carbon atoms, preferably 6 to 15 carbon atoms, in the cycloalkylene residue. Those skilled in the art adequately understand cycloaliphatic diisocyanates simultaneously to mean cyclically and aliphatically bound NCO groups, such as isophorone diisocyanate. In contrast to this, cycloaliphatic diisocyanates are understood to mean those which only have NCO groups directly bound to the cycloaliphatic ring, e.g., $H_{12}MDI$.

Suitable aliphatic and cycloaliphatic isocyanates include cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate (TIN), decane di- and triisocyanate, undecane di- and triisocyanate and dodecane di- and triisocyanate, isophorone diisocyanate (IPDI), hexamethylene diisocyanate (HDI), diisocyanatodicyclohexylmethane ($H_{12}$MDI), 2-methylpentane diisocyanate (MPDI), 2,2,4-trimethylhexamethylene diisocyanate/2,4,4-trimethylhexamethylene diisocyanate (TMDI), norbornane diisocyanate (NBDI), xylylene diisocyanate (XDI), tetramethylxylylene diisocyanate, and dimers, trimers, and combinations thereof.

Additional isocyanates, such as 4-methyl-cyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate, and 1,4-diisocyanato-4-methyl-pentane are also suitable for use according to this disclosure.

Suitable polyurethane prepolymers include the reaction products of a polyisocyanate and an isocyanate-reactive compound reacted at a stoichiometry ratio (NCO/OH) greater than 1.5, or from 2 to 6, or from 2.5 to 4.0. The polyisocyanate is selected from the group consisting of an aromatic isocyanate, an aliphatic isocyanate, a cycloaliphatic isocyanate, and combinations thereof. Suitable isocyanate-reactive compounds that can react with the polyisocyanate to form polyurethane prepolymers include compounds with hydroxyl groups, amino groups, and thio groups. Examples of such compounds include polyesters, polycaprolactones, polyethers, polyacrylates, polycarbonates polyols, and combinations thereof. The average OH number for the isocyanate-reactive compound is from 5 to 2,000 mg KOH/gram, as tested according to D4274-16, and the average molar mass is from 62 to 20,000 g/mol. In some embodiments, the average OH number of the isocyanate-reactive compound is from 14 to 850 mg KOH/gram, or from 56 to 500 mg KOH/gram, or from 110 to 450. The average functionality of the isocyanate-reactive compound is from 1.0 to 6.0, or from 1.8 to 4.0, or from 2.0 to 3.0. The average molecular weight of the isocyanate-reactive compound is from 25 to 12,000 g/mol, or from 250 to 6,000 g/mol, or from 350 to 3,000 g/mol.

(ii) Isocyanate-Terminated Silane Compound

In some embodiments, the isocyanate-terminated silane compound is the reaction product of a polyisocyanate and an isocyanate-reactive compound comprising a silane group and at least one isocyanate-reactive group selected from the group consisting of —OH, —SH, and —NHR, where R stands for an alkyl remainder having from 1 to 12 C atoms or a cycloaliphatic or aromatic remainder having between 6 and 12 C atoms.

In other embodiments, the isocyanate-terminated silane compound is the reaction product of a polyisocyanate selected from the group consisting of isophorone diisocyanate, m-xylylene diisocyanate, mixtures thereof, dimers thereof, trimers thereof, prepolymers thereof, and combinations thereof and an isocyanate-reactive compound comprising a silane group and at least one isocyanate-reactive group of —$NH_2$.

Once prepared, the isocyanate-terminated silane compound is mixed with the isocyanate (i) of the isocyanate component (A) at a mixing ratio of from 99.0 to 1.0 to 0.5 to 99.5, thereby forming a silane-modified isocyanate component.

(B) Isocyanate-Reactive Component

In some embodiments, the isocyanate-reactive component comprises a hydroxyl-terminated compound. In some embodiments, the isocyanate-reactive component comprises a hydroxyl-terminated compound selected from the group consisting of a polyester polyol, a polycaprolactone polyol, a polyether polyol, a polycarbonate polyol, a natural oil-based polyol, and combinations thereof.

The average OH number for the hydroxyl-terminated compound can be from 5 to 2,000 mg KOH/gram, or from 14 to 850 mg KOH/gram, or from 56 to 500 mg KOH/gram, or from 110 to 450. The average functionality of the hydroxyl-terminated compound can be from 2.0 to 6.0, or from 2.0 to 4.0, or from 2.0 to 3.0. The average molecular weight of the hydroxyl-terminated compound can be from 25 to 12,000 g/mol, or from 250 to 6,000 g/mol, or from 350 to 3,000 g/mol. In addition, low molecular weight polyglycols, such as ethylene glycol, diethylene glycol, trimethylolpropane, dipropylene glycol, tripropylene glycol, and triisopropanolamine, can be included in the isocyanate-reactive component as well.

In some embodiments, the isocyanate-reactive component (B) is mixed with the silane-modified isocyanate component at a stoichiometric ratio (NCO/OH) of from 1.0 to 5.0.

Lamination

It is contemplated that the isocyanate component (A) and the isocyanate-reactive component (B) of the disclosed adhesive composition are formulated separately and stored until it is desired to form a laminate structure. Preferably, the isocyanate component (A) and the isocyanate-reactive component (B) are in a liquid state at 25° C. Even if the components are solid at 25° C., it is acceptable to heat the components as necessary to put them into a liquid state. A laminate structure comprising the disclosed adhesive compositions can be formed according to various methods.

In some embodiments, the laminate structure can be formed by pre-mixing the isocyanate component (A) and isocyanate-reactive component (B) before applying the mixed adhesive composition to a substrate. Such methods comprise mixing the isocyanate component (A) and the isocyanate-reactive component (B) at a stoichiometric ratio (NCO/OH) of from 1.0 to 5.0 to form the two-component adhesive composition, the isocyanate component comprising an isocyanate (i) and an isocyanate-terminated silane compound (ii). The methods further comprise applying the adhesive composition to a surface of a first substrate, bringing the surface of the first substrate into contact with a surface of a second substrate, and curing the adhesive composition to bond the first substrate to the second substrate.

In other embodiments, the laminate structure can be formed with relatively-newer laminating techniques (i.e., higher-reactivity systems in which each component is applied to a separate substrate before bringing the substrates together to mix the components). Such methods comprise uniformly applying an isocyanate component (A) to a surface of a first substrate, uniformly applying an isocyanate-reactive component (B) to a surface of a second substrate. Preferably, the thickness of the layer of the each component on the respective substrate is from 0.5 to 2.5 µm. By controlling the thickness of the layers applied to each substrate, the ratio of the components can be controlled. The methods further comprise bringing the first substrate and second substrate together, thereby mixing and reacting the isocyanate component (A) and the isocyanate-reactive component (B) to form an adhesive composition between the first substrate and the second substrate, and curing the adhesive composition to bond the first substrate and the second substrate. The isocyanate component (A) and isocyanate-reactive component (B) begin mixing and reacting when the first and second substrates are brought together and the components come into contact with each other. This marks the beginning of the curing process. Further mixing and reacting is accomplished as the first and second substrates are run through various other rollers and ultimately to a rewind roller. The further mixing and reacting occurs as the first and second substrates pass through rollers because the substrates each take longer or shorter paths than the other substrate across each roller. In this way, the two substrates move relative to one another, mixing the components on the respective substrates. The curable mixture is then cured or allowed to cure.

Suitable substrates in the laminate structure include films such as paper, woven and nonwoven fabric, polymer films, metal foil, and metal-coated (metallized) polymer films. Some films optionally have a surface on which an image is printed with ink which may be in contact with the adhesive composition. The substrates are layered to form a laminate structure, with an adhesive composition according to this disclosure adhering one or more of the substrates together.

In various embodiments, the adhesive compositions can be solventless or solvent-based. In solvent-based embodiments, a solvent such as ethyl acetate, methyl ethyl ketone, toluene, and combinations thereof, can be incorporated in the disclosed two-component adhesive compositions.

In some embodiments, an additive can optionally be included in the adhesive composition. Examples of such additives include, but are not limited to, a catalyst, a surfactant, a leveling agent, a defoamer, a rheology modifier, a color pigment, an adhesion promoter (e.g., phosphate esters and epoxies), and combinations thereof, to enable certain performance attributes.

EXAMPLES OF THE DISCLOSURE

The present disclosure will now be explained in further detail by describing examples illustrating the disclosed adhesive compositions and existing adhesive compositions (Illustrative Examples "IE", Comparative Examples "CE", collectively, "the Examples"). However, the scope of the present disclosure is not, of course, limited to the Examples.

The Examples are prepared using the raw materials identified in Table 1.

TABLE 1

| Raw Materials | | |
|---|---|---|
| Component | General Description | Supplier |
| DYNASYLAN ™ 1122 | Bis (3-triethoxysilyl-propyl) amine | Evonik |
| DYNASYLAN ™ 1124 | Bis (3-trimethoxysilyl-propyl) amine | Evonik |
| DYNASYLAN ™ ANEI | 3-aminopropyltriethoxysilane | Evonik |
| DYNASYLAN ™ GLYMO | 3-glycidyloxypropyl-trimethoxysilane | Evonik |
| VESTANAT ™ IPDI | Isophorone diisocyanate | Evonik |
| ISONATE ™ 125M | Monomeric Methylene diphenyl diisocyanate | The Dow Chemical Company |
| ISONATE ™ OP 50 | Mixture of 4,4'-diphenylmethane diisocyanate and 2,4'-diphenylmethane diisocyanate | The Dow Chemical Company |

TABLE 1-continued

| Raw Materials | | |
|---|---|---|
| Component | General Description | Supplier |
| ISONATE ™ 143L | Modified 4,4'-diphenylmethane diisocyanate | The Dow Chemical Company |
| TAKENATE ™ 500 | m-Xylylene diisocyanate | Mitsui Chemicals |
| VORANOL ™ 220-260 | Polyether polyol, Diol | The Dow Chemical Company |
| ADCOTE ™ 86-116 | Polyether polyol, 75% solid content | The Dow Chemical Company |
| VORANOL ™ CP 450 | Polyether polyol, Triol | The Dow Chemical Company |
| MOR-FREE ™ C117 | Polyester polyol | The Dow Chemical Company |
| ADCOTE ™ X113-43 | Polyester polyol | The Dow Chemical Company |
| VOROPEL ™ T 5001 | Polyether polyol, Triol | The Dow Chemical Company |
| ADCOTE ™ X108-53 | Polyester polyol | The Dow Chemical Company |
| VORANOL ™ 232-034N | Polyether triol | The Dow Chemical Company |
| MOR-FREE ™ 88-138 | Polyol | The Dow Chemical Company |
| INTERMEDIATE 88-140 | Polyester natural oil copolymer | The Dow Chemical Company |
| VORANOL ™ CP 1055 | Polyether polyol, Triol | The Dow Chemical Company |
| TMP | Trimethylolpropane | Aldrich |
| Phosphoric acid | 85% solution in water | Aldrich |
| DESMODUR ™ H | Hexamethylene-1, 6-diisocyanate | Covestro |
| DESMODUR ™ W | Methylene bis (4-cyclohexylisocyanate) | Covestro |
| COREACTANT 9L 10 | Cycloaliphatic polyisocyanate | The Dow Chemical Company |
| MOR-FREE ™ 218 | Polyester Polyol | The Dow Chemical Company |
| 92 LBT | 24 micrometer thick polyethylene terephthalate | |
| Prelam AL | Pre-laminated film made from a polyethylene terephthalate (12 micrometer thick) laminated to soft lamination grade AMCOR ™ aluminum foil (9 μm thick) with ADCOTE ™ 550/Coreactant F | The Dow Chemical Company |
| GF-19 | Polyethylene sealant film containing high amount of slip additive | Berry Plastics |
| GF-10 | Polyethylene sealant film at 25 micrometer thickness | Berry Plastics |
| mPET | Metalized poly(ethylene glycol-terephthalate) film having thickness of 23 micrometer and a 0.02 micrometer aluminum layer on the PET side | FILMTech, Inc. |
| CPP | Cast Polypropylene film (3 mil thick) | FILMTech, Inc. |

Bond Strength Measurement

The 90° T-peel tests are performed on laminate samples cut to 15 mm wide strips and pulled on a Thwing Albert™ QC-3A peel tester equipped with a 50N loading cell at a rate of 10 inch/min on 1 inch strips. When the two films in the laminate separate (peel), the average of the force during the pull is recorded. If one of the films stretches or breaks, the maximum force or force at break is recorded. The values herein are the average of three separate sample strips. The failure mode (FM) or mode of failure (MOF) is recorded as follows: "FS" indicates film stretch; "FT" indicates film tear or break; "DL" indicates delamination (the secondary film separating from the primary film); "AT" indicates adhesive transfer (adhesive fails to adhere to the primary film and is transferred to the secondary film); "AS" indicates adhesive split or cohesive failure (adhesive is found on both primary and secondary film); "MT" indicates transfer of metal from metalized film to secondary film; "PMT" indicates partial metal transfer. The initial or "green" bonds are tested as soon as possible after the laminate are made. Additional T-peel tests are conducted at the time intervals indicated, usually after 1 day and 7 days.

Boil-in-Bag Test Procedure

Laminates are made from the Prelam Al and GF-19 or GF-10. One of the 9"×12" (23 cm×30.5 cm) sheets of laminate is folded over to give a double layer about 9"×6" (23 cm×15.25 cm) such that the PE film of one layer is in contact with the PE film of the other layer. The edges are trimmed on a paper cutter to give a folded piece about 5"×7" (12.7 cm×17.8 cm). Two long sides and one short side are heat sealed at the edges to give a finished pouch with an interior size of 4"×6" (10.2 cm×15.2 cm). The heat sealing is done at 177° C. (350° F.) for 1 second at a hydraulic pressure of 276 kpa (40 PSI). Two or three pouches are made for each test.

Pouches are filled through an open edge with 100±5 ml of 1:1:1 sauce (blend of equal parts by weight of ketchup, vinegar and vegetable oil). Splashing the filling onto the heat seal area is avoided as this could cause the heat seal to fail during the test. After filling, the top of the pouch is sealed in a manner that minimizes air entrapment inside of the pouch.

The seal integrity is inspected on all four sides of pouches to ensure that there are no flaws in the sealing that would cause the pouch to leak during the test. Any suspect pouches are discarded and replaced. In some cases, flaws in the laminate are marked to identify whether new additional flaws are generated during the testing.

A pot is filled two-thirds full of water and brought to a rolling boil. The boiling pot is covered with a lid to minimize water and steam loss. The pot is observed during the test to ensure that there is enough water present to maintain boiling. The pouch(es) are placed in the boiling water and kept there for 30 minutes. The pouches are removed and the extent of tunneling, blistering, de-lamination, or leakage is compared with any of the marked preexisting flaws. The observations are recorded. The pouches are cut open, emptied, and rinsed with soap and water. One or more 1" (2.54 cm) strips are cut from the pouches and the laminate bond strength is measured at 10 inch/min according to the standard bond strength test described earlier. This is done as soon as possible after removing the pouch contents. The interior of the pouches are examined and any other visual defects are recorded.

Chemical Aging Test Procedure

Laminates are made from the Prelam Al/GF-19 and Prelam Al/CPP described above. One of the 9"×12" (23 cm×30.5 cm) sheets of laminate is folded over to give a double layer about 9"×6" (23 cm×15.25 cm) such that the PE film of one layer is in contact with the PE film of the other layer. The edges are trimmed on a paper cutter to give a folded piece about 5"×7" (12.7×17.8 cm). Two long sides and one short side are heat sealed at the edges to give a finished pouch with an interior size of 4"×6" (10.2 cm×15.2 cm). The heat sealing is done at 177° C. (350° F.) for 1 second at a hydraulic pressure of 276 kpa (40 PSI). Two or three pouches are made for each test.

Pouches are filled through the open edge with 100±5 ml of 1:1:1 sauce (blend of equal parts by weight of ketchup, vinegar and vegetable oil). Splashing the filling onto the heat seal area is avoided as this could cause the heat seal to fail during the test. After filling, the top of the pouch is sealed in a manner that minimizes air entrapment inside of the pouch.

The seal integrity is inspected on all four sides of pouches to ensure that there are no flaws in the sealing that would cause the pouch to leak during the test. Any suspect pouches are discarded and replaced. In some cases flaws in the laminate are marked to identify whether new additional flaws are generated during the testing.

The pouches containing the 1:1:1 sauce are than place in a convection oven set at 60° C. (140° F.) for 100 hours. The pouches are removed after aging and the extent of tunneling, blistering, de-lamination, or leakage is compared with any of the marked preexisting flaws. The observations are recorded. The pouches are cut open, emptied, and rinsed with soap and water. One or more 1" (2.54 cm) strips are cut from the pouches and the laminate bond strength is measured according to the standard bond strength test described above. This is done as soon as possible after removing the pouch contents. The interior of the pouches are examined and any other visual defects are recorded.

Isocyanate-Terminated Silane Example 1

A lab glass reactor consisting of a 4-neck flask equipped with a mechanical stirrer and a temperature controller is used to produce the isocyanate component. Under nitrogen purge, 101.52 grams of VESTANAT™ IPDI is loaded to the reactor. With agitation on, 95.89 grams of DYNASYLAN™ AMEO is added to the reactor dropwise. The temperature of the reaction is kept at 65° C. or lower by controlling the addition rate of the DYNASYLAN™ AMEO. The NCO to NH ratio is 2.10. After the addition is completed, the reaction is held at 60° C. for 1 more hour. A clear, viscous liquid is obtained with a NCO content measured at 10.2%.

Isocyanate-Terminated Silane Example 2

In Isocyanate-Terminated Silane Example 1, DYNASYLAN™ AMEO is replaced by DYNASYLAN™ 1122. 82.13 grams of VESTANAT™ IPDI IS first loaded to the reactor, followed by addition of 135 grams of DYNASYLAN™ 1122 dropwise. The NCO to NH ratio is 2.3. After holding the reaction at 60° C. for 1 hour, a clear, viscous liquid is obtained. The reaction product is measured at 8.4% NCO content.

Isocyanate-Terminated Silane Example 3

In Isocyanate-Terminated Silane Example 1, DYNASYLAN™ AMEO is replaced by DYNASYLAN™ 1124, and IPDI is replaced by ISONATE™ 50 OP. 79.2 grams of ISONATE™ OP 50 is first loaded to the reactor, followed by addition of 103 grams of DYNASYLAN™ 1124 dropwise. The NCO to NH ratio is 2.10. After holding the reaction at 60° C. for 1 hour, a clear, viscous liquid is obtained. The reaction product is measured at 7.6% NCO content.

Isocyanate-Terminated Silane Example 4

In Isocyanate-Terminated Silane Example 1, IPDI is replaced by COREACTANT 9L10. 790 grams of COREACTANT 9L10 is first loaded to the reactor, followed by addition of 38 grams of DYNASYLAN™ AMEO dropwise. The NCO to NH ratio is 10.5. After holding the reaction at 60° C. for 1 hour, a clear, viscous liquid is obtained. The reaction product is measured at 11.5% NCO content.

Isocyanate-Terminated Silane Example 5

In Isocyanate-Terminated Silane Example 1, IPDI is replaced by TAKENATE™ 500. 94.1 grams of TAKENATE™ 500 and 66.5 grams of ethyl acetate are first loaded to the reactor and mixed, followed by addition of 105.2 grams of DYNASYLAN™ AMEO dropwise. The NCO to NH ratio is 2.10. After holding the reaction at 60° C. for 1 hour, a clear, viscous liquid is obtained. The reaction product is measured at 8.2% NCO content.

Comparative Isocyanate-Terminated Silane Example 1

In Isocyanate-Terminated Silane Example 1, IPDI is replaced by ISONATE™ OP 50. 120 grams of ISONATE™ OP 50 is first loaded to the reactor, followed by addition of 100 grams of DYNASYLAN™ AMEO dropwise. The NCO to NH ratio is 2.10. White precipitations are observed immediately after addition of AMEO. After holding the reaction at 60° C. for 1 hour, a cloudy, viscous liquid is obtained. The cloudy mixture containing insoluble reaction products is not suitable for laminate adhesive application.

Comparative Isocyanate-Terminated Silane Example 2

In Isocyanate-Terminated Silane Example 1, IPDI is replaced by DESMODUR™ W. 114.9 grams of DESMODUR™ W and 69 grams of ethyl acetate are first loaded to the reactor, followed by addition of 91.6 grams of DYNASYLAN™ AMEO dropwise. The NCO to NH ratio is 2.10. White precipitations are observed immediately after addition of AMEO. After holding the reaction at 60° C. for 1 hour, a cloudy, viscous liquid is obtained. The cloudy mixture containing insoluble reaction products is not suitable for laminate adhesive application.

Comparative Isocyanate-Terminated Silane Example 3

In Isocyanate-Terminated Silane Example 1, IPDI is replaced by DESMODUR™ H. 73 grams of DESMODUR™ H Are first loaded to the reactor, followed by addition of 106.7 grams of DYNASYLAN™ AMEO dropwise. The NCO to NH ratio is 2.15. White precipitations are observed immediately after addition of AMEO. After holding the reaction at 60° C. for 1 hour, a cloudy, viscous liquid is obtained. The cloudy mixture containing insoluble reaction products is not suitable for laminate adhesive application.

Prepolymer Example 1

A lab glass reactor consisting of a 4-neck flask equipped with a mechanical stirrer and a temperature controller is used to produce the isocyanate component. Under nitrogen purge, 196.9 grams of ISONATE™ 125M premelted at 45° C. is first loaded to the flask. The temperature of the reactor is set to 50° C. With agitation on, 402.4 grams of ISONATE™ 143L is charged to the reactor followed by addition of 0.2 grams of phosphoric acid. After mixing for 10 minutes, 173.0 grams of VORANOL™ 220-260 is added to the reactor. Cooling is applied if temperature exceeds 75° C. After reactor temperature is cooled down between 50° C. to 60° C., 78.1 grams of VORANOL™ CP 450 is charged to the reactor. The reaction is held at 75° C. for 2 more hours followed by addition of 149.4 grams of ethyl acetate. After mixing at 75° C. for 0.5 more hours, a clear, low viscosity prepolymer is obtained. The prepolymer is found to have a NCO content of 12.4%, and a solid content at 84%.

Prepolymer Example 2

A lab glass reactor consisting of a 4-neck flask equipped with a mechanical stirrer and a temperature controller is used to produce the isocyanate component. Under nitrogen purge, 449.7 grams of ISONATE™ 125M premelted at 45° C. is loaded to the flask. The temperature of the reactor is set to 50° C. With agitation on, 220.1 grams of MOR-FREE™ 218 is charged to the reactor. Cooling is applied if temperature exceeds 75° C. After reactor temperature is cooled down between 50° C. to 60° C., 330.2 grams of ADCOTE™ X111-43 is charged to the reactor. The reaction is held at 75° C. for 2 more hours followed by addition of 100 grams of ISONATE™ 143L. After holding at 75° C. for 1 more hour, a clear, low viscosity prepolymer is obtained. The prepolymer is found to have a NCO content of 13.3% and a viscosity of 6800 cps at 45° C.

Isocyanate-Reactive Example 1

A lab glass reactor consisting of a 4-neck flask equipped with a mechanical stirrer and a temperature controller is used to produce the isocyanate-reactive component. The temperature of the reactor is set to 65° C. Under nitrogen purge and with agitation on, 316 grams of INTERMEDIATE 88X102 is charged to the reactor, followed by the addition of 0.6 grams of phosphoric acid, 5 grams of TMP premelted at 65° C., 600 grams of ADCOTE™ 86-116, and 84 grams of ethyl acetate. The temperature of the reactor is then raised to 75° C. After mixing at 75° C. for 45 minutes, a clear, low viscosity liquid is obtained. The mixture is found to have a solid content 76.9%, an OH number of 40, and a room temperature viscosity of 890 cps.

Isocyanate-Reactive Example 2

A lab glass reactor consisting of a 4-neck flask equipped with a mechanical stirrer and a temperature controller is used to produce the isocyanate-reactive component. The temperature of the reactor is set to 65° C. Under nitrogen purge and with agitation on, 400 grams of MOR-FREE™ 218 is loaded to the reactor, followed by 600 grams of VORAPEL™ T5001. The temperature of the reactor is then raised to 220° C. With continuous nitrogen purge, after reacting for 5 hours at 220° C., a clear, low viscosity liquid is obtained. The mixture is found to have an OH number of 221.

The temperature of the reactor is then lowered to 65° C. and 1,000 grams of VORAPEL™ T5001 is added to the reactor. After mixing at 65° C. for 30 minutes, the mixture is discharged and is measured with an OH number of 226.

Laminate Example 1

1683.22 grams of Isocyanate-Reactive Example 1, 15.5 grams of Isocyanate-Terminated Silane Example 1, 604.3 grams of Prepolymer Example 1, and 1809.8 grams ethyl acetate are mixed to obtain a 50% solids solution. The solution is then applied to a Prelam Al substrate at a coat weight of 1.7 lb/ream, followed by laminating it with a high slip LLDPE film (GF-19) using a Nordmeccanica LABO COMBI™ pilot laminator. Bond strength between the LLDPE and the foil is measured immediately after the lamination and in intervals of 1 day, 7 days, and 14 days after the lamination. After 7 days, pouches are made using the laminate structure and filled with a 1:1:1 sauce (blend of equal parts by weight of ketchup, vinegar and vegetable oil) for boil-in-bag and heat aging tests. Results on bond strength and failure mode are summarized in Table 1.

Laminate Example 2

1400 grams of Isocyanate-Reactive Example 1, 13.3 grams of Isocyanate-Terminated Silane Example 2, 518.7 grams of Prepolymer Example 1, and 1125.6 grams ethyl acetate are mixed to obtain a 50% solids solution. The solution is then applied to a Prelam Al substrate at a coat weight of 1.65 lb/ream, followed by laminating it with a LLDPE film (GF-10) using a Nordmeccanica LABO COMBI™ pilot laminator. Bond strength between the LLDPE and the foil is measured immediately after the lamination and in intervals of 1 day, 7 days, and 14 days after the lamination. After 7 days, pouches are made using the laminate structure and filled with a 1:1:1 sauce (blend of equal parts by weight of ketchup, vinegar and vegetable oil) for boil-in-bag and heat aging tests. Results on bond strength and failure mode are summarized in Table 1.

Comparative Laminate Example 1

620 grams of Prepolymer Example 1 is first mixed with 15.5 grams of DYNASYLAN™ GLYMO at 65° C. for 1.5 hours before cooled down to room temperature. The mixture is then mixed with 1683.22 grams of Isocyanate-Reactive Example 1 and 1809.8 grams of ethyl acetate to obtain a 50% solids solution. The solution is then applied to a Prelam Al substrate at a coat weight of 1.75 lb/ream, followed by laminating it with a high slip LLDPE film (GF-19) using a Nordmeccanica LABO COMBI™ pilot laminator. Bond strength between the LLDPE and the foil is measured immediately after the lamination and in intervals of 1 day, 7 days, and 14 days after the lamination. After 7 days, pouches are made using the laminate structure and filled with a 1:1:1 sauce (blend of equal parts by weight of ketchup, vinegar and vegetable oil) for boil-in-bag and heat aging tests. Results on bond strength and failure mode are summarized in Table 1.

Comparative Laminate Example 2

With agitation on, 15.5 grams of DYNASYLAN™ AMEO is added dropwise to 620 grams of Prepolymer Example 1 in a glass reactor. Temperature of the reactor is maintained at 65° C. or lower. A cloudy liquid is obtained after reacted at 65° C. for 1.5 hours. The mixture is then cooled down to room temperature and mixed with 1683.22 grams of Isocyanate-Reactive Example 1 and 1809.8 grams of ethyl acetate are mixed to obtain a 50% solids solution. The solution is then applied to a Prelam Al substrate at a coat weight of 1.68 lb/ream, and followed by laminating it with a high slip LLDPE film (GF-19) using a Nordmeccanica LABO COMBI™ pilot laminator. Bond strength between the LLDPE and the foil is measured immediately after the lamination and in intervals of 1 day, 7 days, and 14 days after the lamination. After 7 days, pouches are made using the laminate structure and filled with a 1:1:1 sauce (blend of equal parts by weight of ketchup, vinegar and vegetable oil) for boil-in-bag and heat aging tests. Results on bond strength and failure mode are summarized in Table 1.

Laminate Example 3

100 grams of Isocyanate-Reactive Example 2, 6.32 grams of Isocyanate-Terminated Silane Example 1, 151.68 grams of Prepolymer Example 2 are mixed. The mixture is then applied to a metalized PET substrate at a coat weight of 1.15 lb/ream, and followed by laminating it with a high-slip LLDPE film (GF-19) using a Nordmeccanica LABO COMBI™ pilot laminator. Bond strength between the LLDPE and the foil is measured immediately after the lamination and in intervals of 3 hours, 1 day, 7 days, and 14 days after the lamination. After 7 days, pouches are made using the laminate structure and filled with a 1:1:1 sauce (blend of equal parts by weight of ketchup, vinegar and vegetable oil) for boil-in-bag and heat aging tests. Results on bond strength and failure mode are summarized in Table 2.

Laminate Example 4

100 grams of Isocyanate-Reactive Example 2, 6.32 grams of Isocyanate-Terminated Silane Example 2, 151.68 grams of Prepolymer Example 2 are mixed. The mixture is then applied to a metalized PET substrate at a coat weight of 1.18 lb/ream, and followed by laminating it with a high-slip LLDPE film (GF-19) using a Nordmeccanica LABO COMBI™ pilot laminator. Bond strength between the LLDPE and the foil is measured immediately after the lamination and in intervals of 3 hours, 1 day, 7 days, and 14 days after the lamination. After 7 days, pouches are made using the laminate structure and filled with a 1:1:1 sauce (blend of equal parts by weight of ketchup, vinegar and vegetable oil) for boil-in-bag and heat aging tests. Results on bond strength and failure mode are summarized in Table 2.

Comparative Laminate Example 3

Under nitrogen purge, 117.2 grams of ISONATE™ 125M premelted at 45° C. are loaded to a lab glass reactor consisting of a 4-neck flask equipped with a mechanical stirrer and a temperature controller. Temperature of the reactor is set to 50° C. With agitation on, 21.6 grams of ADCOTE™ X108-53 premelted at 60° C. is charged to the reactor. Cooling is applied if temperature exceeds 75° C. After reactor temperature cools down between 50° C. to 60° C., 43.1 grams of BESTER™ 648 is charged to the reactor, followed by addition of 40.0 grams of VORANOL™ 232-034N, and 0.88 grams of MOR-FREE™ C117. After reacting at 75° C. for 2 hours, 2.3 grams of ISONATE™ 143L are added to the reactor. After mixing for 1 more hour at 75° C., a clear, low viscosity prepolymer is obtained. The prepolymer is found to have a NCO content of 14.5% and a viscosity of 3800 cps at 25° C.

Under nitrogen purge, 18.6 grams of MOR-FREE™ 88-138, 65.9 grams of Intermediate 88-140, and 140.5 grams of VORANOL™ CP 1055 are loaded to a lab glass reactor consisting of a 4-neck flask equipped with a mechanical stirrer and a temperature controller. Temperature of the reactor is set at 50° C. After mixing at the temperature for 45 minutes, a clear, low viscosity liquid is obtained. The mixture is then cooled down to RT before it is used as a coreactant for the prepolymer. The mixture is found to have an OH number of 160.

82 grams of the coreactant and 100 grams of the prepolymer are mixed. The mixture is then applied to a metalized PET substrate at a coat weight of 1.15 lb/ream, and followed by laminating it with a high-slip LLDPE film (GF-19) using a Nordmeccanica LABO COMBI™ pilot laminator. Bond strength between the LLDPE and the foil is measured immediately after the lamination and in intervals of 3 hours, 1 day, 7 days, and 14 days after the lamination. After 7 days, pouches are made using the laminate structure and filled with a 1:1:1 sauce (blend of equal parts by weight of ketchup, vinegar and vegetable oil) for boil-in-bag and heat aging tests. Results on bond strength and failure mode are summarized in Table 2.

TABLE 1

|  | Laminate Example 1 | Laminate Example 2 | Comparative Laminate Example 1 | Comparative Laminate Example 2 |
| --- | --- | --- | --- | --- |
| Green Bond, g/inch | 241 ± 7 (AS) | 219 ± 5 (AS) | 206 ± 15(AS) | 220 ± 16(AS) |
| 1-day Bond, g/inch | 1557 ± 97 (FT) | 1768 ± 123(FT) | 1481 ± 124 (FT) | 1411 ± 93 (FT) |
| 7-day Bond, g/inch | 1341 ± 35 (FT) | 1847 ± 55 (FT) | 1437 ± 71(FT) | 1655 ± 136(FT) |

TABLE 1-continued

|  | Laminate Example 1 | Laminate Example 2 | Comparative Laminate Example 1 | Comparative Laminate Example 2 |
|---|---|---|---|---|
| 14-day bond, g/inch | 1617 ± 108 (FT) | 1929 ± 98 (FT) | 1423 ± 59 (FT) | 1309 ± 141 (FT) |
| Boil-in-bag, g/inch | 1159 ± 23 (FS) | 1503 ± 76 (FT) | 17 ± 8 (Tunnel) | 650 ± 74 (Tunnel) |
| 60° C. 100 hour aging, g/inch | 508 ± 17 (AS) | 167 ± 8 (AS) | 20 ± 1(DL) | 25 ± 2(DL) |

As indicated in Table 1, the illustrative solvent-based examples exhibit improved chemical and heat resistance compared to the comparative examples, as illustrated by the boil-in-bag and 60° C. aging test.

TABLE 2

|  | Laminate Example 3 | Laminate Example 4 | Comparative Laminate Example 3 |
|---|---|---|---|
| 3 hours, g/inch | 99 ± 6 (AS) | 48 ± 2(AS) | 62 ± 1(AS) |
| 1 day, g/inch | 562 ± 75 (FT) | 658 ± 100 (FT) | 776 ± 59 (FT) |
| 7 day, g/inch | 1036 ± 197 (FT) | 539 ± 64 (FT) | 1047 ± 247 (FT) |
| 14 day, g/inch | 1309 ± 174 (FT) | 473 ± 68 (FT) | 869 ± 40 (FT) |
| Boil-in-bag, g/inch | 1246 ± 234 (FT) | 469 ± 24(FT) | 292 ± 15(AS) |
| 60° C. 100 hour aging, g/inch | 456 ± 47(FT) | 300 ± 2(FT) | 227 ± 8(AT) |

As indicated in Table 2, the illustrative solventless examples exhibit improved chemical and heat resistance compared to the comparative examples, as illustrated by the boil-in-bag and 60° C. aging test.

In addition to the embodiments described above, many embodiments of specific combinations are within the scope of the disclosure, some of which are described below:

Embodiment 1. A two-component adhesive composition, comprising:
 (A) an isocyanate component comprising:
  (i) an isocyanate; and
  (ii) an isocyanate-terminated silane compound that is the reaction product of a polyisocyanate and an isocyanate-reactive compound comprising a silane group and at least one isocyanate-reactive group selected from the group consisting of —OH, —SH, and —NHR, where R stands for an alkyl remainder having from 1 to 12 C atoms or a cycloaliphatic or aromatic remainder having between 6 and 12 C atoms; and
 (B) an isocyanate-reactive component comprising a hydroxyl-terminated compound,
 wherein the isocyanate component (A) and isocyanate-reactive component (B) are present at a stoichiometric ratio (NCO to OH) of from 1 to 5.

Embodiment 2. A two-component adhesive composition, comprising:
 (A) an isocyanate component comprising:
  (i) an isocyanate; and
  (ii) an isocyanate-terminated silane compound that is the reaction product of a polyisocyanate selected from the group consisting of isophorone diisocyanate, m-xylylene diisocyanate, mixtures thereof, dimers thereof, trimers thereof, prepolymers thereof, and combinations thereof and an isocyanate-reactive compound comprising a silane group and at least one isocyanate-reactive group of —NH$_2$; and
 (B) an isocyanate-reactive component comprising a hydroxyl-terminated compound,
 wherein the isocyanate component (A) and isocyanate-reactive component (B) are present at a stoichiometric ratio (NCO to OH) of from 1 to 5.

Embodiment 3. The two-component adhesive composition of any preceding or succeeding Embodiment, wherein the isocyanate is selected from the group consisting of an isocyanate monomer, a polyisocyanate, an isocyanate prepolymer, and combinations thereof.

Embodiment 4. The two-component adhesive composition of any preceding or succeeding Embodiment, further comprising a solvent selected from the group consisting of ethyl acetate, methyl ethyl ketone, toluene, and combinations thereof.

Embodiment 5. The two-component adhesive composition of any preceding or succeeding Embodiment, further comprising an additive selected from the group consisting of a catalyst, a surfactant, a leveling agent, a defoamer, a rheology modifier, a color pigment, an adhesion promoter, and combinations thereof.

Embodiment 6. The two-component adhesive composition of any preceding or succeeding Embodiment, wherein the hydroxyl-terminated compound of the isocyanate-reactive component (B) is selected from the group consisting of a polyester polyol, a polycaprolactone polyol, a polyether polyol, a polycarbonate polyol, a natural oil-based polyol, and combinations thereof.

Embodiment 7. The two-component adhesive composition of any preceding or succeeding Embodiment, wherein the hydroxyl-terminated compound of the isocyanate-reactive component (B) has an OH number from 5 to 2,000 mg KOH/gram.

Embodiment 8. The two-component adhesive composition of any preceding or succeeding Embodiment, wherein the hydroxyl-terminated compound of the isocyanate-reactive component (B) has an OH number from 14 to 850 mg KOH/gram.

Embodiment 9. The two-component adhesive composition of any preceding or succeeding Embodiment, wherein the hydroxyl-terminated compound of the isocyanate-reactive component (B) has an OH number from 56 to 500 mg KOH/gram.

Embodiment 10. The two-component adhesive composition of any preceding or succeeding Embodiment, wherein the hydroxyl-terminated compound of the isocyanate-reactive component (B) has a functionality of from 2.0 to 6.0.

Embodiment 11. The two-component adhesive composition of any preceding or succeeding Embodiment, wherein the hydroxyl-terminated compound of the isocyanate-reactive component (B) has a functionality of from 2.0 to 4.0.

Embodiment 12. The two-component adhesive composition of any preceding or succeeding Embodiment, wherein the hydroxyl-terminated compound of the isocyanate-reactive component (B) has a functionality of from 2.0 to 3.0.

Embodiment 13. The two-component adhesive composition of any preceding or succeeding Embodiment, wherein the hydroxyl-terminated compound of the isocyanate-reactive component (B) has a molecular weight of from 25 to 12,000 g/mol.

Embodiment 14. The two-component adhesive composition of any preceding or succeeding Embodiment, wherein the hydroxyl-terminated compound of the isocyanate-reactive component (B) has a molecular weight of from 250 to 6,000 g/mol.

Embodiment 15. The two-component adhesive composition of any preceding or succeeding Embodiment, wherein the hydroxyl-terminated compound of the isocyanate-reactive component (B) has a molecular weight of from 350 to 3,000 g/mol.

Embodiment 16. A method for preparing a two-component adhesive composition, comprising:
(1) reacting, at a stoichiometry ratio of from 1.05/1.0 to 20.0/1.0, a polyisocyanate with an isocyanate-reactive compound comprising a silane group and at least one isocyanate-reactive group selected from the group consisting of —OH, —SH, and —NHR, where R stands for an alkyl remainder having from 1 to 12 C atoms or a cycloaliphatic or aromatic remainder having between 6 and 12 C atoms, to form an isocyanate-terminated silane compound;
(2) mixing the isocyanate-terminated silane compound with an isocyanate component comprising an isocyanate at a mixing ratio of from 99.0 to 1.0 to 0.5 to 99.5, to form a silane-modified isocyanate component; and
(3) mixing the silane-modified isocyanate component with an isocyanate-reactive component comprising a hydroxyl-terminated compound at a stoichiometric ratio (NCO/OH) of from 1.0/1.0 to 5.0/1.0.

Embodiment 17. A method for preparing a two-component adhesive composition, comprising:
(1) reacting, at a stoichiometry (NCO/NH) ratio of from 1.05/1.0 to 20.0/1.0, a polyisocyanate selected from the group consisting of isophorone diisocyanate, m-xylylene diisocyanate, mixtures thereof, dimers thereof, trimers thereof, prepolymers thereof, and combinations thereof with an isocyanate-reactive compound comprising a silane group and at least one isocyanate-reactive group of —NH$_2$, to form an isocyanate-terminated silane compound;
(2) mixing the isocyanate-terminated silane compound with an isocyanate component comprising an isocyanate at a mixing ratio of from 99.0 to 1.0 to 0.5 to 99.5, to form a silane-modified isocyanate component; and
(3) mixing the silane-modified isocyanate component with an isocyanate-reactive component comprising a hydroxyl-terminated compound at a stoichiometric ratio (NCO/OH) of from 1.0/1.0 to 5.0/1.0.

Embodiment 18. A method for forming a laminate structure, comprising:
(1) coating the two-component adhesive of any preceding or succeeding Embodiment on a surface of a first substrate;
(2) bringing the surface of the first substrate into contact with a surface of a second substrate; and
(3) laminating the two substrates under pressure to form a laminate structure.

Embodiment 19. A method for forming a laminate structure, comprising:
(1) uniformly applying the isocyanate component (A) of any preceding Embodiment on a surface of a first substrate;
(2) uniformly applying the isocyanate-reactive component (B) of any preceding Embodiment on a surface of a second substrate;
(3) bringing the surface of the first substrate into contact with the surface of the second substrate, thereby mixing and reacting the isocyanate component (A) and the isocyanate-reactive component (B) to form an adhesive composition between the first substrate and the second substrate; and
(4) curing the adhesive composition to bond the first substrate and the second substrate.

Embodiment 20. The laminate structure formed according to Embodiment 18 or Embodiment 19.

Embodiment 21. A laminate structure comprising the two-component adhesive of any preceding or succeeding Embodiment.

That which is claimed is:

1. A two-component adhesive composition, comprising:
(A) an isocyanate component comprising:
(i) an isocyanate, wherein the isocyanate is a one or more aromatic isocyanate; and
(ii) an isocyanate-terminated silane compound that is the reaction product of a polyisocyanate and an isocyanate-reactive compound comprising a silane group and at least one isocyanate-reactive group selected from the group consisting of —OH, —SH, and —NHR, where R stands for an alkyl remainder having from 1 to 12 C atoms or a cycloaliphatic or aromatic remainder having between 6 and 12 C atoms; and
(B) an isocyanate-reactive component comprising a hydroxyl-terminated compound,
wherein the isocyanate component (A) and isocyanate-reactive component (B) are present at a stoichiometric ratio (NCO to OH) of from 1 to 5.

2. A two-component adhesive composition, comprising:
(A) an isocyanate component comprising:
(i) an isocyanate, wherein the isocyanate is a one or more aromatic isocyanate; and
(ii) an isocyanate-terminated silane compound that is the reaction product of a polyisocyanate selected from the group consisting of isophorone diisocyanate, m-xylylene diisocyanate, mixtures thereof, dimers thereof, trimers thereof, prepolymers thereof, and combinations thereof and an isocyanate-reactive compound comprising a silane group and at least one isocyanate-reactive group of —NH$_2$; and
(B) an isocyanate-reactive component comprising a hydroxyl-terminated compound,
wherein the isocyanate component (A) and isocyanate-reactive component (B) are present at a stoichiometric ratio (NCO to OH) of from 1 to 5.

3. The two-component adhesive composition of claim 1, wherein the isocyanate is selected from the group consisting of an isocyanate monomer, a polyisocyanate, an isocyanate prepolymer, and combinations thereof.

4. The two-component adhesive composition of claim 1, further comprising a solvent selected from the group consisting of ethyl acetate, methyl ethyl ketone, toluene, and combinations thereof.

5. The two-component adhesive composition of claim 1, further comprising an additive selected from the group consisting of a catalyst, a surfactant, a leveling agent, a defoamer, a rheology modifier, a color pigment, an adhesion promoter, and combinations thereof.

6. The two-component adhesive composition of claim 1, wherein the hydroxyl-terminated compound of the isocyanate-reactive component (B) is selected from the group consisting of a polyester polyol, a polycaprolactone polyol, a polyether polyol, a polycarbonate polyol, a natural oil-based polyol, and combinations thereof.

7. A method for forming a laminate structure, comprising:
   (1) coating the two-component adhesive of claim 1 on a surface of a first substrate;
   (2) bringing the surface of the first substrate into contact with a surface of a second substrate; and
   (3) laminating the two substrates under pressure to form a laminate structure.

8. A method for forming a laminate structure, comprising:
   (1) uniformly applying the isocyanate component (A) of claim 2 on a surface of a first substrate;
   (2) uniformly applying the isocyanate-reactive component (B) of claim 2 on a surface of a second substrate;
   (3) bringing the surface of the first substrate into contact with the surface of the second substrate, thereby mixing and reacting the isocyanate component (A) and the isocyanate-reactive component (B) to form an adhesive composition between the first substrate and the second substrate; and
   (4) curing the adhesive composition to bond the first substrate and the second substrate.

9. The laminate structure formed according to claim 7.

10. A laminate structure comprising the two-component adhesive of claim 1.

11. The two-component adhesive composition of claim 1, wherein the one or more aromatic isocyanate is selected from the group consisting of 1,3- and 1,4-phenylene diisocyanate, 1,5-naphthylene diisocyanate, 2,6-tolulene diisocyanate (2,6-TDI), 2,4-tolulene diisocyanate (2,4-TDI), 2,4'-diphenylmethane diisocyanate (2,4'-MDI), 4,4'-diphenylmethane diisocyanate (4,4-MDI), polymeric isocyanates, and combinations thereof.

12. The two-component adhesive composition of claim 2, wherein the one or more aromatic isocyanate is selected from the group consisting of 1,3- and 1,4-phenylene diisocyanate, 1,5-naphthylene diisocyanate, 2,6-tolulene diisocyanate (2,6-TDI), 2,4-tolulene diisocyanate (2,4-TDI), 2,4'-diphenylmethane diisocyanate (2,4'-MDI), 4,4'-diphenylmethane diisocyanate (4,4-MDI), polymeric isocyanates, and combinations thereof.

\* \* \* \* \*